United States Patent

[11] 3,609,710

[72] Inventor Thomas E. Browne
Naperville, Ill.
[21] Appl. No. 828,934
[22] Filed May 29, 1969
[45] Patented Sept. 28, 1971
[73] Assignee Bell Telephone Laboratories, Incorporated
Murray Hill, Berkeley Heights, N.J.

[54] ASSOCIATIVE MEMORY CELL WITH INTERROGATION ON NORMAL DIGIT CIRCUITS
23 Claims, 5 Drawing Figs.

[52] U.S. Cl. .......... 340/173 AM, 340/173 FF, 307/279
[51] Int. Cl. .......... G11c 11/40, G11c 15/00, G11c 7/00
[50] Field of Search .......... 340/174, 173; 307/279

[56] References Cited

UNITED STATES PATENTS

| | | | |
|---|---|---|---|
| 3,390,382 | 6/1968 | Igarashi | 340/173 |
| 3,221,158 | 11/1965 | Roth et al. | 340/173 X |
| 3,312,956 | 4/1967 | Bremer et al. | 240/173.1 |
| 3,328,769 | 6/1967 | Lee | 340/173 X |
| 3,418,639 | 12/1968 | Lee | 340/173 |

OTHER REFERENCES

IBM Technical Disclosure Bulletin, " Associative Memory Cell" by Repchick, Vol. 10, No. 4, 9/67 pgs. 502- 503, copy in 340- 173 Assoc. Mem.

IBM Technical Disclosure Bulletin, " Associative Memory Cell" by Behnke, Vol. 10, No. 11, 4/68, pgs. 1715- 1716, copy in 340- 173 Assoc. Mem.

*Primary Examiner*—Stanley M. Urynowicz, Jr.
*Attorneys*—R. J. Guenther and Kenneth B. Hamlin

ABSTRACT: A semiconductor memory cell is adapted for associative memory use by applying interrogation input information on the normal cell digit circuits that are also used for reading and writing operations. A pair of interrogation transistors compare digit circuit signals to the prevailing state of the cell and provide a corresponding indicator signal to a memory match signal bus. Several techniques are disclosed for realizing advantageous coupling between the interrogation transistors and the match bus and for implementing a match detector circuit for use with the bus. The several techniques, in conjunction with the use of insulated gate field effect transistors and the multipurpose digit circuits, are employed in different sets of circumstances to achieve different operating features.

INVENTOR
T. E. BROWNE
BY
Charles Scott Phelan
ATTORNEY

ASSOCIATIVE MEMORY CELL WITH INTERROGATION ON NORMAL DIGIT CIRCUITS

BACKGROUND OF THE INVENTION

1. Field of the Invention

This invention relates to associative memory cells, and it relates in particular to such cells utilizing nonmagnetic devices in information storage.

2. Description of the Prior Art

It is known in the art to utilize semiconductor bistable circuits comprising cross-coupled insulated gate field effect transistors (IGFETS) for information storage. It is also known to utilize the same type of transistor, but with a different predetermined conductance, for resistive devices in such bistable circuits. However, when such bistable circuits are employed for associative operation two pairs of digit circuits are normally utilized for supplying complementary information signals to the cell. At least one pair is employed for normal read and write operations, and an additional pair is employed to supply information signals to be utilized for the associative interrogation of the cell. The separate circuits avoid the possibility of interrogation circuit cross-coupling that could destroy stored information during normal readout. However, such a separate pair of digit circuits for interrogation purposes requires the dedication of semiconductor material area in an integrated circuit memory array since material underlying such circuits which are common to a plurality of cells is not, in the present state of the art, conveniently useful for other purposes. The utilization of extra semiconductor area becomes a significant manufacturing cost for the manufacture of large integrated circuit semiconductor memory arrays. Furthermore, such IGFET associative memory cells have had their interrogation comparing means coupled directly to a matching circuit which is used in common by a number of cells so that the operating speed of the memory during interrogation is to a significant degree dependent upon the number of cells sharing the matching circuit.

It is also known to form semiconductor associative memory cells with the more conventional bipolar transistors instead of IGFETS. Associative cells utilizing bipolar transistors have employed a common digit circuit pair for both digit write and interrogation functions. However, these circuits have a number of drawbacks. The bipolar transistors usually require more manufacturing steps than do IGFETS; and, consequently, the bipolar transistors represent correspondingly higher manufacturing costs. Cell operating techniques used with bipolar transistors are not readily adaptable for use with IGFETS because the bilateral conductive nature of the IGFET offers operating advantages not available with bipolar transistors, particularly in regard to coupling memory digit circuits. In addition, the bipolar associative memory cells which have utilized multifunction digit circuits have also used separate unbalanced readout circuits for coupling cell readout signals to a detector; and, consequently, the bipolar transistor cells require additional semiconductor area for the extra readout circuit as well as losing the advantage of cancellation of longitudinal noise, which advantage is available in memory cells having digit circuits for accommodating complementary signals. Certain prior art bipolar transistor cells also use the digit circuits for supplying power to the memory cells and thereby accept limitation on memory size because digit circuit resistance causes nonuniform current supply levels to the cells on the digit circuit.

Prior art semiconductor associative memory cells have also utilized IGFETS which have comparatively high threshold voltages. The threshold voltage is the voltage by which gate electrode voltage must be depressed below source electrode voltage in the case of a P-channel enhancement mode field effect transistor in order to initiate transistor conduction. These comparatively high thresholds in prior art circuits require the use of proportionately high voltages elsewhere in the same circuit and force the size of a memory power supply which is needed for holding, interrogating, or changing the information stored in a memory to be correspondingly large. Likewise the packing density is correspondingly lower in high-threshold-device systems due to limitations on power dissipation to assure reliable and stable circuit operation.

It is, therefore, one object of the present invention to improve associative memory cells.

It is another object to reduce semiconductor material area requirements for associative memory cells utilizing semiconductor devices.

A further object is to reduce the cost of manufacturing and operating associative memory cells.

SUMMARY OF THE INVENTION

A bistable memory cell for use in an associative memory is accessed by a set of circuits which serve all of the functions of supplying information signals for both writing and associative interrogation, and of conducting memory cell readout signals from the cell. Another set of circuits serves the functions of supplying cell control to enable readout and writing operations, as distinguished from interrogation, and for receiving associative match output indications.

It is one feature of the invention that a plurality of cells of the type described are incorporated in a memory array of electrical rows and columns of cells in which the access circuits comprise a set of pairs of row circuits and a set of pairs of column circuits as well as a power supply bus.

It is another feature that the memory cell utilizes insulated gate field effect transistors for ease of manufacture; and, in preferred embodiments, those transistors are of the type having dual-layer insulation between gate connection and channel for permitting operation with greatly reduced threshold voltages.

A further feature is that isolation gating controlled by memory cell operation couples the cell interrogation output to a matching circuit for making the cell operation speed during the cell interrogation essentially independent of the number of cells which share a match circuit.

It is yet another feature that interrogation transistors which compare input interrogation signals with the current state of the memory cell are in one embodiment connected for minimum current drain from cell digit circuits, while in another embodiment they are connected for maximum information stability during nondestructive readout.

BRIEF DESCRIPTION OF THE DRAWING

A more complete understanding of the invention and its various features, objects, and advantages may be obtained from the following detailed description when taken in conjunction with the appended claims and the attached drawing in which:

DETAILED DESCRIPTION

Figure 1:
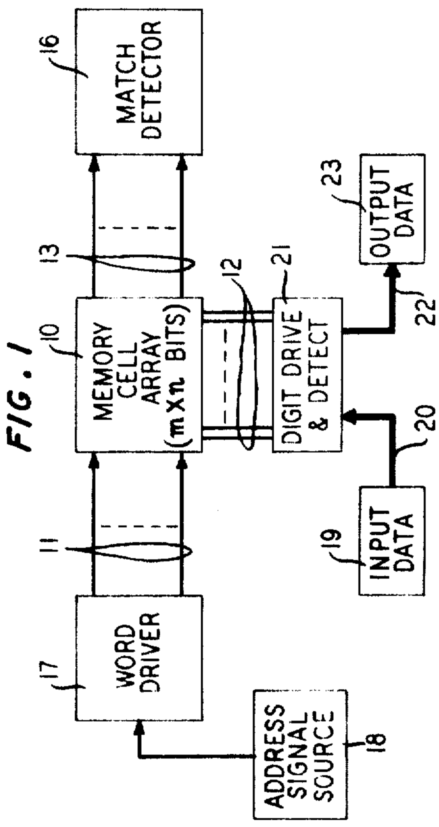
FIG. 1 is a block and line diagram of an associative store system utilizing the invention.

FIG. 1 depicts a store system which is controlled by a central processor, not shown, in a general manner which is known in the art. An array 10 of memory cells is provided for storing bits of binary coded information on a one-cell-per-bit basis. The array includes $m \times n$ cells which are arranged in an electrical coordinate array which includes $n$ rows and $m$ columns of cells. Each cell is controlled by signals on a plurality of leads including one of the $n$ word drive leads 11 and one of the $m$ pairs of column circuits 12. Column circuits 12 perform the memory digit functions of conveying information signals from the digit drive and detect circuits 21 for writing information into the memory cells and for associative interrogation of the memory contents, as well as conducting readout signals from the memory cells during readout operations.

A group of *n* match circuits 13 are provided in paired association with respective word drive circuits 11 in the rows of the memory 10 for conveying signals from the memory to match detectors 16 for indicating whether or not the memory contains information corresponding to that supplied by the digit drive and detect circuits 21 on the column circuits 12 during interrogation. Such match signals advantageously include a current of at least a minimum predetermined value, if there is no match; and no current if the interrogation information is matched by a word stored in memory. Match circuits are strobed, as will be described, to distinguish the mismatch and no interrogation conditions. Resolving circuits, not shown, respond to the absence of current on one or more of the match circuits 13 to determine the address of the memory word with which each is associated so that such address information can be supplied through the central processor to the address signal source 18 for actuating the memory to produce a corresponding readout.

Operating energy is, of course, required for the memory cells, and this is provided by additional circuits not shown in FIG. 1. However, memory cell array 10 is advantageously formed by integrated circuit manufacturing techniques now known in the art, and the power supply circuits accordingly comprise a circuit extending through the array for supplying ground reference potential to all cell circuits and a connection to the integrated circuit substrate which is common to the entire array for completing the power supply circuit back to the power source.

A word driver 17 receives address signals from the aforementioned central processor by way of the address signal source 18 for defining one of the word leads 11 to which a drive voltage is to be applied for memory reading or writing. For example, in an integrated circuit array word leads 11 are advantageously held at a predetermined positive voltage until such time as it is necessary to write into or read out of the memory, and then the selected word lead is dropped to ground reference potential by the word driver 17.

Figure 5:
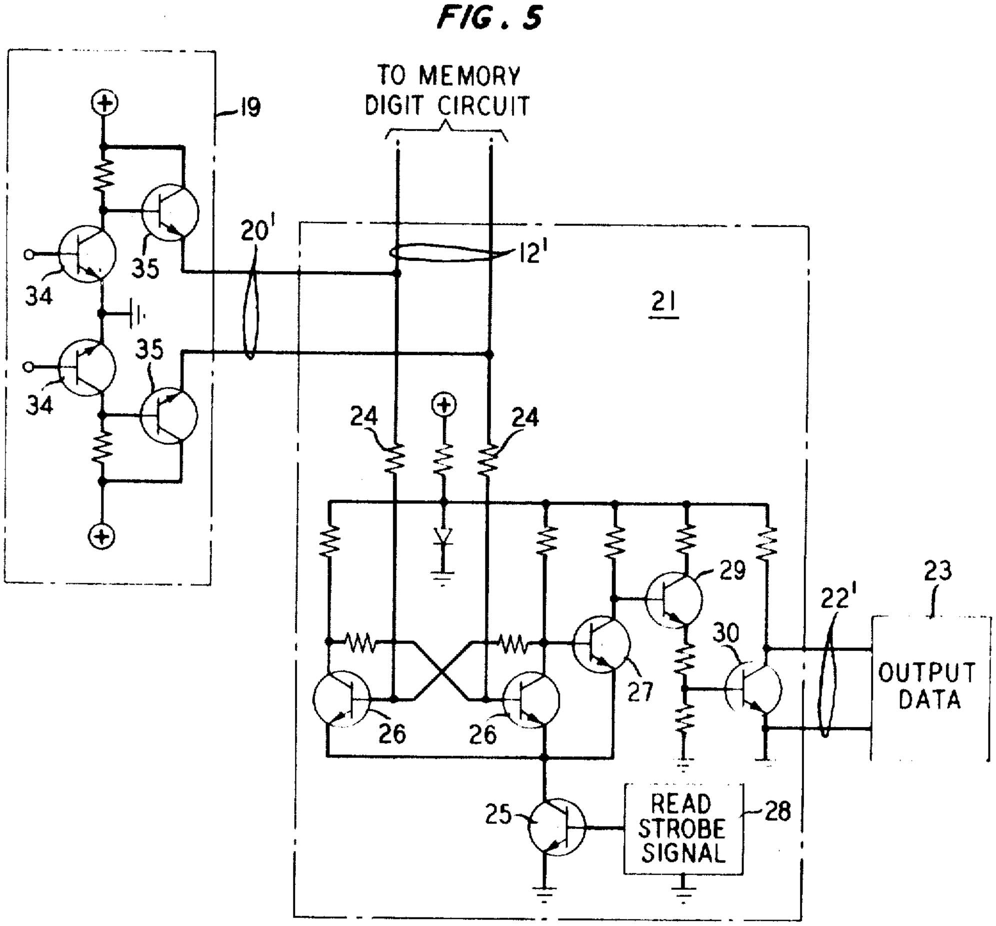
FIG. 5 s a schematic diagram of a digit access circuit used in FIG. 1.

An input data source 19, also operating under the direction of the central processor, supplies complementary data signals by way of a cable 20 through digit drive and detect circuit 21 to the digit column circuits 12. Cable 20 includes *m* circuits so that a full *m*-bit word is written or interrogated in a single operation. The column circuits 12 are also coupled to circuit 21 to provide memory readout signals by way of cable 22 to a data output circuit 23. Digit drive and detect circuit 21 is thus adapted to permit digit circuits 12 both to receive signals from input data source 19 and to transmit signals to output data circuit 23. Details of one bit position of such a circuit are shown in FIG. 5. Additional bit positions are identically arranged and their details are not shown.

In FIG. 5 one column circuit pair 12' is coupled through two resistors 24 to base electrodes of a pair of resistively cross-coupled NPN transistors 26 of the bipolar type. Emitter electrodes of the transistors are coupled to ground through an additional NPN transistor 25 to form an emitter-gated bistable circuit which is controlled by the output of a read strobe signal source 28. During readout operations, the source 28 is actuated by the central processor to allow the bistable circuit to assume one of its stable states as determined by the one of the digit circuits 12' which is then coupled to a memory cell output terminal that is at a high potential. Bistable circuit output is coupled through transistors 27, 29, and 30 and circuit 22' to output data circuit 23. Transistor 27 shares the emitter-gating supplied by transistor 25 and when thus enabled it assumes a conducting or nonconducting state as a function of the stable state of the bistable circuit. Transistors 29 and 30 are biased on or off together when transistor 27 is off or on, respectively.

In input data circuit 19, two pairs of transistors 34 and 35 determine the voltage levels on digit circuits 12' when the memory is simply holding information or during writing or interrogation operations. Conduction in either transistor 34 causes its corresponding transistor 35 to be enabled for conduction and thereby place the corresponding one of digit circuits 12' in a low voltage state at about ground potential. However, if a transistor 34 is off, its corresponding transistor 35 is enabled for conduction at a much higher level and places the corresponding one of digit circuits 12' in a high voltage state corresponding to the collector electrode voltage of the transistor 35. In either case transistor 35 actually conducts only when its emitter electrode has a ground return path through a memory cell during writing or interrogation, as will be described, or through one of the transistors 26 during readout. Central control provides equal high or low voltages to base electrodes of transistors 34 if digit circuits 12' are to be held low or high, respectively, depending upon which of the embodiments of the invention is being employed. Central control provides complementary signals to those base electrodes for supplying input information for writing or interrogating.

Figure 2:
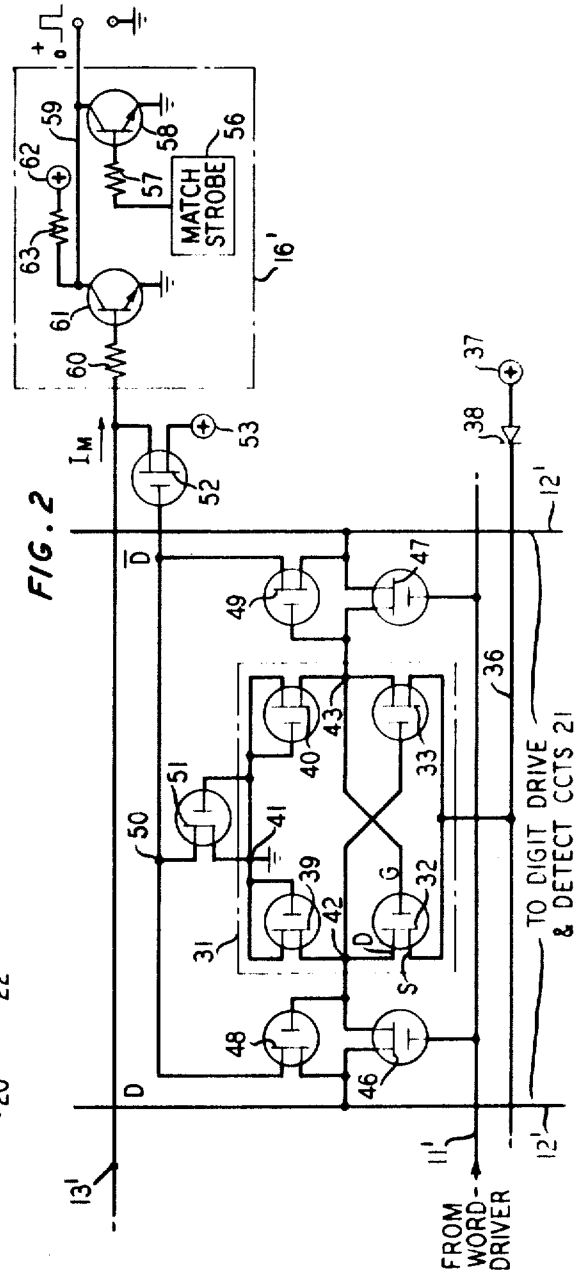

FIG. 2 schematically represents a single cell of the memory 10. This cell comprises a semiconductor bistable circuit 31. The bistable circuit is of a well-known type advantageously utilizing P-channel enhancement mode IGFETS except that it and the other circuits in the cell of FIG. 2 employ low threshold voltage IGFETS rather than the usual IGFETS normally found in such circuits. The threshold voltage of typical field effect transistors employed in the prior art is about 5 volts, i.e., for P-channel enhancement mode transistors the gate voltage must be at least 5 volts below the source voltage in order to initiate or sustain conduction in a transistor with a 5-volt threshold. By contrast, low threshold field effect transistors may have a threshold voltage in a range such as .5 to 1.5 volts. Transistors of the latter type include a laminated dielectric under the metallic gate electrode and including a layer of silicon dioxide with an overlayer of either aluminum silicate or aluminum oxide as taught and claimed in the copending application Ser. No. 647,555, filed June 20, 1967, for H. E. Nigh, J. Stack, and S. K. Tung, and now U.S. Pat. No. 3,502,950.

By selecting silicon dioxide layers of different thicknesses, IGFETS with different threshold voltages in the aforementioned low threshold voltage range are readily obtained; and, if the silicon dioxide layer is made sufficiently thin, the transistor is converted to a depletion mode transistor instead of an enhancement mode transistor.

Bistable circuit 31 includes a pair of cross-coupled transistors 32 and 33, each of which has its gate electrode connected to the drain electrode of the other transistor. Source electrodes of the two transistors are connected together and to a power supply bus 36 which supplies operating current to the bistable circuit from a voltage source 37 through a diode 38. By way of example, source 37 advantageously presents an output voltage of about 6 volts. Source 37 is schematically represented as a circled plus sign to indicate a potential source having its positive terminal connected at the circuit point indicated by the circled plus sign and having its negative terminal connected to ground. Similar schematic representation is employed throughout the drawings.

The drain electrodes of transistors 32 and 33 are connected to ground through source-drain paths of two further transistors 39 and 40, respectively, which also have their respective gate electrodes connected at a terminal 41 to ground. Transistors 39 and 40 each operate as a load resistor whenever its source electrode is more positive than its drain electrode by at least the IGFET threshold voltage. In a typical circuit the semiconductor substrate provides the power supply bus 36, and the aforementioned ground connection at a terminal 41 is provided by a metallic circuit deposited on the memory array and extending to all of the cells of the array in electrical multiple connections.

In accordance with known prior art design techniques for insulated gate field effect transistor bistable circuits, the conductance factor of the transistors 39 and 40 is made approximately one-fiftieth of the conductance factor of the transistors 32 and 33 by appropriate dimensioning of the respective transistor channels. Consequently, if the bistable circuit stands with the transistor 32 conducting to store a binary ONE information bit, a circuit terminal 42 between transistors 32 and 39 is at a high positive voltage with respect to ground because of the potential difference developed across the transistor 39. That positive voltage is less than a threshold voltage below the positive potential of bus 36 so that the transistor 33 is held nonconducting. A further bistable circuit output terminal 43 between transistors 33 and 40 thus rests at approximately ground potential as coupled through the nonconducting drain-source path of the transistor 40. This low voltage at terminal 43 maintains transistor 32 in conduction. If the bistable circuit were storing a binary ZERO information bit, terminal 43 would be positive and terminal 42 would be ground indicating a reversal of the previously mentioned conduction states of the circuit transistors.

Access to the bistable circuit 31 for reading or writing is achieved by driving the word circuit 11′ from a positive voltage, corresponding approximately to the output of source 37, to ground. This operation grounds gate electrodes of a pair of insulated gate field effect transistors 46 and 47 to enable conduction therein. These transistors advantageously have conductance factors which are approximately 2.5 times smaller than the conductance factors of transistors 32 and 33 and may operate for bipolar conduction in a direction depending upon the polarity of voltage applied across their remaining two electrodes. In order to read information out of the cell of FIG. 2, the digit circuits 12′ remain at their normal low voltage level near ground potential as previously described in connection with the circuit 21 of FIG. 5, and at the same time the word drive circuit 11′ is dropped to ground. Under these conditions, the one of the access transistors 46 and 47 which is connected to the high voltage output terminal of the bistable circuit 31 conducts current from the bus 36 through the bistable circuit and such transistor to the corresponding one of the digit circuits 12′. The other one of the two access transistors 46 and 47 is unable to conduct at all because it is connected to the low voltage output terminal of the bistable circuit 31 and, consequently, has all of its electrodes at approximately ground potential. This readout is derived from the cell of FIG. 2 without destroying the information stored therein because the voltage developed across the conducting access transistor is sufficient to hold off the nonconducting cross-coupled transistor of circuit 31.

In order to write information into the cell of FIG. 2, the word drive circuit 11′ is dropped to its low voltage level at the same time that appropriate complementary information signals are applied to circuits 12′. Such information signals place one of the digit circuits 12′ at ground and hold the other at a positive voltage, e.g., about 6 volts positive. If at this time transistor 32 is conducting because a binary ONE is stored in the cell, and the digit circuit coupled through transistor 46 to bistable circuit terminal 42 is held at a high voltage while the other digit circuit is pulled down to ground, no change in the state of the bistable circuit 31 will take place because the mentioned digit circuit voltage conditions simply reenforce the conduction states already existing in the cell. However, if at that time the transistor 33 is conducting and transistor 32 is nonconducting, terminal 42 is at ground potential; and the high voltage coupled through transistor 46 and that terminal to the gate electrode of transistor 33 biases the latter transistor to a nonconducting state. The resulting drop in voltage at terminal 43 turns transistor 32 on so that the bistable circuit stores a binary ONE upon the removal of the digit drive signals. Similar operation takes place if a binary ZERO is to be written into the bistable circuit 31.

For associative operation of the cell in FIG. 2 the word drive circuit 11′ is maintained at its normal high voltage for holding the access transistors 46 and 47 disabled because that voltage is within a threshold voltage of whichever one of the remaining two electrodes of both transistors may be biased high as a source voltage. Input information signals of complementary form for interrogating the cell are applied from the input data source 19 on digit circuits 12′. These information signals are compared with the signal voltage levels at output terminals 42 and 43 of the bistable circuit 31 by an additional pair of insulated gate field effect transistors 48 and 49 which have their drain electrodes connected together at a common terminal 50. The latter terminal is connected to ground through the source to the drain path of another load-connected transistor 51. Transistors 48 and 49 have conductance factors of about the same value as transistors 46 and 47, and the conductance factor of transistor 51 is about the same as that of transistors 39 and 40. Thus, if the output information signal at each of the output terminals 42 or 43 is at approximately the same voltage level as the interrogation input information signals on the associated digit circuits 12′, the gate and source electrodes of transistors 48 and 49 are within a threshold voltage of each other and remain in a nonconducting condition. However, if the complementary information states at the bistable circuit output terminals and at the digit circuits 12′ are different, one of the interrogation transistors 48 or 49 is held in its nonconducting state, and the other is biased for conduction.

Assume that terminal 42 is in the high voltage state and the associated digit circuit is at ground. In this condition the gate electrode of transistor 48 is positive with respect to the source electrode, and that transistor is held nonconducting. However, the opposite situation prevails at transistor 49 because its gate electrode is held at a low voltage corresponding to the output at terminal 43 while its source electrode is held high by the corresponding digit line. Consequently, transistor 49 supplies current from the complementary data signal source 19 through its associated one of the digit circuits 12′ and its source-drain path to terminal 50. This current returns through transistor 51 and ground terminal 41 to the input data source 19. The resulting potential difference across transistor 51 drives the gate electrode of a further transistor 52 to a higher voltage to turn off that transistor and cut off the supply of current from a source 53 to the match bus 13′. Transistor 52 has a conductance factor which is about 2.2 times larger than that of transistors 48 and 49. Source 53 represents a substrate connection and supplies the same voltage as supply circuit 36. In the absence of conduction in transistor 51, transistor 52 is normally enabled to supply current to the match bus 13′.

In one embodiment according to FIG. 2 conductance factors in units of microamperes per squared volt were employed as follows:

| | |
|---|---|
| Transistors 31 and 32 | 72 |
| Transistors 39, 40, and 51 | 1.5 |
| Transistors 46, 47, 48, and 49 | 27 |
| Transistor 52 | 60 |

A match detector circuit 16′ is coupled to receive current from match bus 13′ and comprises one of the match detectors 16 in FIG. 1. In match detector 16′ a match strobe circuit 56 is actuated by the central processor to supply a negative-going pulse through a resistor 57 to the base electrode of a bipolar transistor 58. The collector-emitter path of that transistor is connected between an output circuit 59 and ground so that the appearance of the mentioned strobe pulse turns off transistor 58 and removes a ground clamp from the circuit 59. The potential on the latter circuit is then able to move in accordance with the dictates of matching current $I_M$ in match bus 13′.

The match current in match bus 13′ is coupled through a current limiting resistor 60 to a base electrode of a further bipolar transistor 61 which has its collector-emitter path connected between a source 62 and ground through a collector resistor 63. If sufficient match current is present, i.e., a transistor 52 on for at least one of the cells on bus 13′, transistor 61 conducts during the interrogation strobe pulse from the strobe source 56. This condition holds the output lead at essentially ground potential to indicate that a mismatch exists in the memory word to which the match bus 13′ is coupled. However, if at that time a match condition prevails, no current is present on match bus 13'. Transistor 61 is unable to conduct, and output circuit 59 rises to the voltage of source 62. Such a match condition occurs when every cell along the match bus 13' is subjected to input information conditions on its digit circuits which cause its transistor 51 to conduct and thereby turn off its corresponding transistor 52. Those conditions prevail either in the previously described situation wherein the complementary signals at output terminals 42 and 43 are the complement of interrogation information signals supplied to the associated digit circuit 12', or in the situation where both digit circuits 12' of a cell are held at the high voltage condition to indicate the "don't-care" interrogation information state for that particular cell. Of course, a don't-care condition for an entire word can be directed by simply blocking the match strobe signal at source 56.

Transistors 51 and 52 provide a circuit mechanism for reducing the possibility of destroying stored information during readout in the illustrated cell embodiment, as will be hereinafter discussed in greater detail. However, the same transistors also lend another beneficial effect. During an associative interrogation of the memory there are usually current changes on the match bus 13', and the time required for such changes affects the part of memory cycle time that must be allotted to interrogation. In prior art circuits wherein the interrogation transistors were directly connected to the match bus, the memory operating speed becomes seriously dependent upon the number of cells connected to a match bus because all of their interrogation transistor capacitance in interrogation transistor pairs must be charged before match bus current can change. However, transistors 51 and 52 tend to isolate the cells from bus 13' because only transistor 52 is connected to the bus at each cell. Thus, the transistor capacitance that must be charged is halved because the number of transistors per cell connected to bus 13' is halved. Furthermore, transistor 52 in this circuit amplifies the interrogation signal coupled to bus 13'. Accordingly, the necessary signal swing at terminal 50 can be as small as device characteristics permit and still appear on bus 13' with sufficient amplitude to permit the desired speed of operation during interrogation. The latter amplitude is also quite small because bus 13' is in series with the base-emitter junction of grounded-emitter transistor 61 so very little signal swing is required to operate the detector. Memory operating speed is correspondingly increased.

In the embodiment of FIG. 2 the interrogation transistors 48 and 49 do not disturb the match detector 16' during normal readout operations because during normal readout operations transistor 52 remains in the conducting state. There is also no disturbance of the information stored in the bistable circuit 31 as a result of the presence of the interrogation transistors because their gate electrodes are connected to output terminals 42 and 43, respectively, which are necessarily at complementary information states. Consequently, during a readout operation one of the interrogation transistors must have its gate electrode at a higher voltage than its source electrode so that it is unable to conduct. The other one of the interrogation transistors must then of necessity have its gate and source electrodes at approximately the same low ground voltage so that it also is unable to conduct. Since at this time both transistors 48 and 49 are nonconducting, no potential difference is developed across the load transistor 51; and there is no chance to turn on one of the interrogation transistors in the reverse mode, i.e., with its source and drain electrode functions interchanged. There is, thus, no danger of providing a closed current path through the interrogation transistors between bistable output terminals 42 and 43. If such a path were to appear, it could result in the destruction of information stored in circuit 31.

It should be noted that, even through there is no conduction through transistor 51, it does function as a resistor to the extent that the ground reference potential at terminal 41 is coupled through transistor 51 to the gate electrode of transistor 52 so that the latter transistor remains able to supply current to match bus 13' from source 53.

During the writing operation, the match detector 16' is not disturbed by changes in current on the match bus 13' so long as the match strobe signal is not applied during that time.

Interrogation transistors 48 and 49 do not interfere with the writing operation for reasons similar to those already noted in connection with the readout operation. Either the source and gate electrodes of both such transistors are at essentially the same potential when the write-in information is the same as that which is already in the bistable circuit 31 or a first one of the interrogation transistors is held nonconducting because its source-gate potential difference is of the incorrect polarity, i.e., gate higher than source, to allow conduction. For the second one of the interrogation transistors, where the polarity may be proper, the magnitude of the difference can be only momentarily sufficient to exceed the threshold voltage. During that brief interval when there is sufficient voltage to allow conduction in that second interrogation transistor, there is insufficient diversion of drive current through that transistor and the transistor 51 either to prevent the desired triggering of bistable circuit 31 or to allow reverse mode conduction in the first interrogation transistor, which at that time has a large reverse gate-to-source bias. However, if for some applications the brief turn-on of an interrogation transistor during interrogation is objectionable, it can be remedied by exchanging gate connections of transistors 48 and 49. Then the interrogation transistor comes on only when the stored information and input information are the same and the current diversion is of no consequence.

It was previously noted that a diode 38 is connected in series with the output of source 37. Diode 38 is used to drop the supply voltage for the entire cell array relative to the digit circuit supply from source 19 to facilitate writing or interrogation. Thus, in some situations it is possible that, for match or don't-care functions, insufficient voltage will be developed across transistor 51 to turn off transistor 52 where both the cell and data source 19 work from the same power supply. That is, transistor junction drops within source 19 and conductor losses getting to a cell of the memory may be great enough to prevent the development of sufficient voltage at terminal 50 to bring the transistor 52 gate up within a threshold of source 53. This possibility is avoided by adding one or more diodes 38 between circuit 36 and source 37. Consequently, the voltage of circuit 36 and the source 53 is reduced without affecting the output from source 19 and thereby guarantees that transistor 51 can turn off transistor 52 at the proper timer.

It will be observed in FIG. 2 that the memory cell includes only IGFETS and wire interconnections among them for bistable circuit 31, access transistors, interrogation transistors, and coupling transistors for actuating match bus 13'. Furthermore, only two digit circuits, two word circuits (drive and match), and one power supply circuit are required to utilize the cell.

Figure 3:
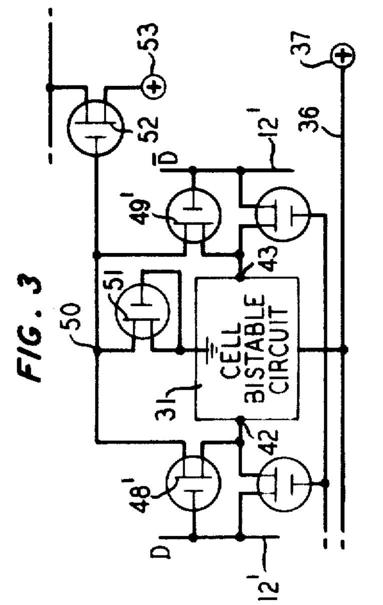
FIGS. 2, 3 and 4 are partial schematic diagrams of different embodiments of associative memory cells incorporating the invention.

An additional embodiment of the invention is shown in FIG. 3 for meeting the situation wherein it is necessary to minimize current drain from the digit circuits 12' during associative interrogation operations. This is accomplished by interchanging the source and gate connections for each interrogation transistor while maintaining other memory cell connections essentially the same. Thus, interrogation transistor 48' has its gate electrode connected to the associated digit circuit and its source electrode connected to output terminal 42. Similarly, the gate electrode of transistor 49 is connected to its associated digit circuit, and its source electrode is connected to output terminal 43. In this arrangement the transistors 48' and 49' still function to compare information signal states on the digit circuits with the corresponding states on the bistable circuit output terminals. However, when one of the interrogation transistors conducts in FIG. 3, it draws its current from source 37 through the bistable circuit 31 instead of from data signal source 19 through the digit lines 12' as was the case in FIG. 2.

The FIG. 3 arrangement permits operation in a shorter interrogation time because current drawn through bistable circuit 31 is supplied from the substrate terminal of source 37 with considerably less spurious capacitance that must be charged than in the case for the FIG. 2 arrangement wherein such current is supplied through the digit circuits which extend across the face of an integrated memory cell array. Furthermore, the current supplied in FIG. 3 to the interrogation transistors is actually the normal cell information current which is simply being diverted from one of the cell load transistors 49 or 40 to flow to ground through one of the interrogation transistors 48′ or 49′ and the load transistor 51. Consequently, lower power supply capability is required for FIG. 3 than for circuits requiring separate currents for circuit 31 and for interrogation transistors.

Another difference with respect to FIG. 2 is that in FIG. 3 the digit circuits are normally held at the high voltage level and are dropped to the low level for reading or for the don't-care indication during interrogation. This is the reverse of the states used for FIG. 2 and is necessitated by the need to avoid having one of the interrogation transistors on at all times in FIG. 3.

A further difference with respect to FIG. 2 is that the diode 38 is eliminated in FIG. 3. In FIG. 2, one of the interrogation transistors was always off during a normal readout operation because its gate electrode was at a higher voltage than its source electrode. There was, therefore, no danger of destroying stored information by allowing one of the interrogation transistors to turn on in the reverse conduction mode, i.e., source and drain electrode functions interchanged, and thereby interconnecting terminals 42 and 43. In FIG. 3, however, one of the interrogation transistors normally turns on during a readout operation. It is then possible in some applications with specially proportioned transistor gains and conductances to raise the potential at terminal 50 sufficiently during a normal readout operation to turn on the nonconducting interrogation transistor in the reverse conduction mode.

One way to avoid destructive readout and assure information stability in FIG. 3 for a fairly broad range of conductances is to fix the voltage of source 53 sufficiently below the voltage of circuit 36 to assure turnoff of the transistor 52 with a very small voltage change at terminal 50, that voltage therefore being insufficient to cause reverse mode conduction in transistor 49′ or 48′, whichever is off. Since a separate source is thus required for source 53, the diode 38 of FIG. 2 is not required in FIG. 3. A disadvantage of this solution is that it requires an additional power supply lead across the entire memory array.

Another way to avoid the possibility of destructive readout, but with a fairly broad range of permissible conductances, and without a separate voltage requirement for source 53, is to fix the thresholds of at least transistors 48′ and 49′, so that they exceed the possible source-drain voltage drop across an access transistor 46 or 47 which is connected to the high output terminal of bistable circuit 31. This prevents either interrogation transistor from conducting during readout and is done by appropriate selection of gate insulation thickness as taught in the aforementioned Nigh et al. application. Such threshold selection would not significantly increase the power supply requirements for the memory.

Figure 4:
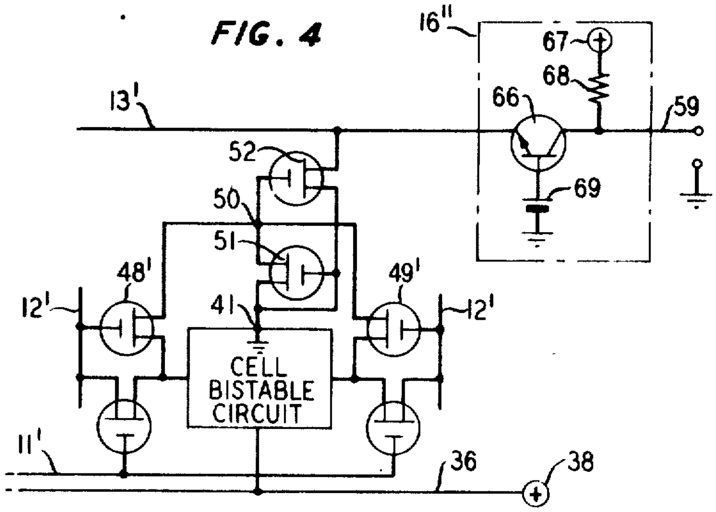

In FIG. 3, voltages or device thresholds were used as variable parameters to eliminate a potential information instability for a cell of some given geometry. Other solutions become available by appropriate selection of cell geometry, and FIG. 4 illustrates one such solution.

The problem of avoiding destructive readout in associative memory cells of the type disclosed herein has two aspects. Terminal 50 must be prevented during readout from rising enough in response to current from one interrogation transistor in the reverse mode, thereby interconnecting terminals 42 and 43 and destroying stored information. On the other hand, terminal 50 must be raised enough during associative interrogation for match or don't-care conditions to guarantee that transistor 52 will be turned off. In other words, the terminal 50 must be raised to within a threshold voltage of the voltage of source 53 without exceeding the voltage of the higher digit circuit by a threshold voltage. These restrictions can be met by fixing the geometry for given materials for interrogation transistors 48′ and 49′ in relation to the corresponding properties of transistor 51 to assure the desired result. Such result is achieved by selecting a ratio for conductance factors C, which involves materials properties and device geometry, to satisfy the following equality which relates the source-drain current of the transistors to their terminal voltages:

$$V_I=\sqrt{C_I/C_A}\ (V_O-V_D-V_T).$$

The factor $C$ is indicative of transistor conductance, $C_I$ for interrogation transistors, and $C_A$ for the load transistor 51. $V_I$ is the lowest acceptable voltage with respect to ground for terminal 50 which will assure turnoff of transistor 52, $V_O$ is the high side output voltage of bistable circuit 31, $V_D$ is the highest voltage with respect to gro und attainable by a digit circuit after being dropped from its normal high voltage state during readout, and $V_T$ is the transistor threshold voltage for transistors 48′, 49′, and 52′. The factor $C$ mentioned is calculable from the following well-known relationship:

$$c=\mu K\epsilon_0 W/t\ L$$

where $\mu$ is an average hole surface mobility in the transistor channel material, $K$ is the relative dielectric constant of the gate insulation material, $\epsilon_0$ is the permittivity of free space, $t$ is the thickness of the gate dielectric layer, and $W$ and $L$ are the width and length, respectively, of the transistor conduction channel.

A typical conductance factor ratio $C_I$:$C_A$ satisfying the $V_I$ equality is about 1:9 for a circuit of the type shown in FIG. 4 using a 6-volt supply for source 37 and a transistor threshold voltage of about 1 volt. In such an embodiment, an interrogation transistor conductance factor of about 1.5 and a transistor 51 conductance factor of about 13.5 are employed. The interrogation transistor conductance factor is much lower here than it was in FIG. 2 because in FIG. 4 a much smaller signal is used at terminal 50.

The FIG. 4 modification of the embodiment of FIG. 3 is the preferred embodiment of the invention. It combines the advantages of low digit circuit current drain and high resistance to destructive readout with broad leeway on transistor conductance factors. FIG. 4 is generally similar to FIG. 3 with two principal exceptions. One change is that the transistor 52 is connected to operate with its connection to bus 13′ being a source electrode, and its drain electrode is connected to ground terminal 41. The other change is the utilization of a modified match detector 16″. Transistors 51 and 52 are now, in a sense, cross-coupled in that the gate electrode of each transistor is connected to one other electrode of the other transistor.

Match detector 16″ includes a bipolar transistor 66 which supplies current from a source 67 through a collector circuit resistor 68 to the match bus 13′. A further source represented by a battery 69 is connected between ground and the base electrode of transistor 66 and has a terminal voltage which is approximately equal to the sum of the two threshold voltages for the field effect transistors 51 and 52 in the memory cell, the base-to-emitter voltage drop for transistor 66 in conduction, and a further voltage increment corresponding to the voltage $V_I$ which is dependent upon the operating characteristics of the memory cell as previously mentioned. In the quiescent, or holding, state of the memory cell, digit circuits 12′ and the word circuit 11′ are all at the high voltage level corresponding to the output voltage of source 37. As before, transistor 52 is normally enabled for conduction, but here the reason is that its gate electrode is at a potential or approximately one threshold voltage, the drain electrode is connected to ground, and the source is connected to match bus 13′ which, as mentioned herein before, resides at a voltage slightly greater than two threshold voltages. Transistor 52 provides a return current path to ground for the aforementioned current from match detector 16″.

Transistor 66 in detector 16″ is normally biased for conduction by the battery 69, which is poled for forward conduction through the base-emitter junction of transistor 66. Since the voltage of match bus 13′ is equal to the sum of two IGFET thresholds plus the aforementioned increment representing the necessary swing for terminal 50, it becomes apparent that the latter swing can be much smaller in the connection of FIG. 4 than in the other embodiments where the source electrode voltage from transistor 52 is supplied from source 53, e.g., through the cell substrate. Consequently, the danger of turning on an interrogation transistor in a reverse conduction mode during readout becomes virtually negligible. In like manner, the power supply requirements are similarly reduced because the normal voltage and current on bus 13' are lower than in the other embodiments. Those requirements can be made still lower by strobing the circuit of transistor 66 to prevent current flow in bus 13' except during the strobe interval. Various strobe circuits could be used, and one advantageously employed used a processor-controlled strobe pulse source for battery 69. As previously described for other embodiments of the invention, the transistor 52 in FIG. 4 is turned off during an associative interrogation for either the don't-care situation in which both digit lines are pulsed to the low voltage state or for the match condition.

Transistor conductance factors for the bistable circuit, and its access transistors and load transistor 51, in the embodiment of FIG. 4 are of the same type illustratively indicated in connection with FIG. 2.

Thus, the use of transistors 51 and 52 with appropriate connections and match detector make it possible to interrogate an associative memory cell on the normal digit circuits without destroying stored information and without requiring cell power to be supplied over the digit circuits. At the same time the cell capacitance associated with a match bus is reduced and the match bus voltage swing required is held to a low level so that memory speed on interrogation is enhanced.

Although the present invention has been described with reference to particular embodiments and applications thereof, it is to be understood that further modifications, embodiments, and applications that will be obvious to those skilled in the art are included within the spirit and scope of the invention.

What is claimed is:

1. In combination,
   - at least one storage means having at least two stable states of operation, each state representing a different type of information,
   - a pair of terminals in said bistable storage means for receiving input information signals to determine the state of said storage means and for providing at the same terminals output information signals representing the current stable state of said storage means,
   - circuit means supplying both said input information signals and additional information signals and for receiving said output signals,
   - gate means selectively operable to couple said input information signals from said circuit means to said terminals and to exclude said additional information signals from said terminals, and
   - means coupled between said circuit means and said terminals for comparing said excluded signals with said output signals to indicate said current stable state in relation to said excluded signals.

2. The combination in accordance with claim 1 in which
   - said storage means includes circuits coupling operating current thereto at a first voltage,
   - a match circuit is provided,
   - switch means couple an output of said comparing means to said match circuit, said switch means having a predetermined voltage threshold for initiating operation and which is much smaller than said first voltage, and
   - said match circuit includes means supplying operating current to said switch means at a second voltage which is somewhat greater than said threshold voltage but much smaller than said first voltage.

3. The combination in accordance with claim 1 in which
   - means independent of said circuit means are provided for supplying operating current to said storage means.

4. The combination in accordance with claim 1 in which
   - said pair of terminals in each of said storage means comprises a pair of circuit points at different complementary voltage levels for representing two different types of information during different stable states of storage means operation, and
   - said circuit means comprise a pair of circuits coupled to respective ones of the circuit points of said pair for each said cell.

5. The combination in accordance with claim 1 in which
   - said gate means for each storage means comprises a pair of insulated gate field effect transistors coupled between said circuit means and each of said terminals, and
   - means connect gate electrodes of the last-mentioned transistors together.

6. The combination in accordance with claim 1 in which
   - a plurality of said storage means are arranged in *m* electrical columns and *n* electrical rows,
   - said circuit means comprise *m* circuit pairs, each pair supplying complementary information signals to all gate means of said storage means in a different one of said columns,
   - *n* circuits are connected for supplying word drive control signals to said gate means of all said storage means of a different one of said rows for coupling said input signals and excluding said additional signals, and
   - *n* additional circuits each connected to all storage means of a different one of said rows for receiving indicating signals from said comparing means thereof.

7. The combination in accordance with claim 1 in which
   - said storage means includes at least one connection to which operating potential is supplied,
   - a pair of insulated gate field effect transistors is provided, each of said transistors having a gate electrode which is cross-coupled to an additional electrode of the other transistor,
   - means connect both a gate electrode and another additional electrode of a first one of said cross-coupled transistors to said operating potential terminal,
   - a match circuit is provided,
   - means connect another additional electrode of a second one of said pair of transistors to said match circuit, and
   - means couple said gate electrode of said second transistor to said comparing means to receive the comparing means indication.

8. The combination in accordance with claim 7 in which said match circuit comprises
   - a further transistor having base, emitter, and collector electrodes,
   - a connection supplying current from said further transistor emitter to said second transistor of each of said storage means in parallel, and
   - a potential source connected in series between said storage means and said base electrode, said potential source being poled for forward conduction of current in said further transistor.

9. The combination in accordance with claim 1 in which
   - said storage means, said gate means, and said comparing means all comprise insulated gate field effect transistor circuits.

10. The combination in accordance with claim 9 in which
    - said insulated gate field effect transistor circuits include transistors which have only wire interconnections.

11. The combination in accordance with claim 9 in which
    - all of said transistor circuits utilize insulated gate field effect transistors having gate-channel insulation comprising dielectric material laminations of different types of dielectric materials.

12. The combination in accordance with claim 9 in which
    - said storage means includes a pair of insulated gate field effect transistors which are cross-coupled for bistable circuit operation, and
    - said pair of transistors each has a substantially higher conductance factor than do other transistors of said combination.

13. The combination in accordance with claim 12 in which said gate means and said comparing means include transistors having conductance factors about 2½ times larger than the conductance factors of said cross-coupled transistors.

14. The combination in accordance with claim 1 in which said comparing means comprises for each of said storage means a pair of insulated gate field effect transistors connected in series between said gating means for respective ones of said terminals of said storage means, and such series connection having a common terminal between said transistors.

15. The combination in accordance with claim 14 in which a match circuit is provided, means including an additional insulated gate field effect transistor couple an output of said comparing means to said match circuit, said additional transistor being operable between nonconducting and conducting conditions by the comparing means indication to affect current in said match circuit, said additional transistor having a predetermined source-gate threshold voltage that must be at least attained to support said conducting condition, said additional transistor and said pair of transistors have conductance factors $C_A$ and $C_I$, respectively, which are proportioned to satisfy the following relation:

$$V_I=\sqrt{C_I/C_A}\,(V_0-V_D-V_T)$$

where $V_I$ is the lowest voltage at said additional transistor gate which can turn off said additional transistor, $V_O$ is a signal output voltage at the higher voltage one of said terminals of the bistable storage means, $V_D$ is the highest signal voltage on said circuit means, and $V_T$ is said threshold voltage.

16. The combination in accordance with claim 14 in which each of said transistors is connected to supply current to said common terminal from said circuit means in response to different information signal states at a respective one terminal of said storage means and at said circuit means.

17. The combination in accordance with claim 14 in which each of said transistors is connected to supply current to the common terminal from a corresponding one of said terminals of said storage means in response to different information signal states at a terminal of said storage means and at said circuit means.

18. The combination in accordance with claim 14 in which each of said transistors includes a gate electrode and two additional electrodes, one of said additional electrodes of each of said transistors is connected to said common terminal, and each of said transistors has its gate electrode and the other of its additional electrodes each connected to a different one of said circuit means and one of said storage means terminals.

19. The combination in accordance with claim 18 in which each of said comparing means transistors has its gate electrode connected to a different one of said terminals of said storage means, and each such transistor has its other additional electrode connected to said circuit means.

20. The combination in accordance with claim 18 in which each of said comparing means transistors has its gate electrode connected to said circuit means, and each such transistor has its other addition electrode connected to a different one of said terminals of said storage means.

21. The combination in accordance with claim 14 in which means including a pair of source terminals supply operating current to said storage means, means connect said common terminal of said series connection to one of said source terminals for developing a potential difference in response to a comparing means signal at said common terminal, a match circuit is provided for conducting current, and switch means are coupled between said common terminal and said match circuit for changing current in said match circuit as a function of said signal at said common terminal.

22. The combination in accordance with claim 21 in which said switch means comprises a source of current, and an insulated gate field effect transistor coupling the last-mentioned source to said match circuit.

23. The combination in accordance with claim 22 in which said switch means transistor has a predetermined voltage threshold for initiating transistor conduction, means supply operating current to said storage means and to said switch means transistor, and means in said supply means reducing voltage at which current is supplied to said storage means to a level which is less than voltage at which current is supplied to said switch means transistor by an amount corresponding approximately to twice said threshold voltage.